United States Patent [19]

Chiarella

[11] Patent Number: 4,845,786
[45] Date of Patent: Jul. 11, 1989

[54] LIGHTWEIGHT MOLDED PROTECTIVE HELMET

[76] Inventor: Michele A. Chiarella, Via Vall'Orba 22, Lugano, Switzerland

[21] Appl. No.: 66,755

[22] Filed: Jun. 24, 1987

[51] Int. Cl.⁴ ............................................... A42B 3/02
[52] U.S. Cl. ........................................ 2/412; 2/413; 2/425
[58] Field of Search ................ 2/181.6, 181.8, 182.8, 2/410, 411, 412, 413, 425; 264/532; 428/137, 166

[56] References Cited

U.S. PATENT DOCUMENTS

| | | | |
|---|---|---|---|
| 3,437,631 | 4/1969 | Cleveland | 2/411 X |
| 3,736,201 | 5/1973 | Teraoka | 264/529 X |
| 3,972,075 | 8/1976 | Alevras | 2/410 X |
| 4,075,717 | 2/1978 | Lemelson | 2/412 |
| 4,100,320 | 7/1978 | Chisum | 2/411 X |
| 4,354,284 | 10/1982 | Gooding | 2/413 |
| 4,443,891 | 4/1984 | Blomgren et al. | 2/425 X |
| 4,521,369 | 6/1985 | Marcinek | 264/532 |
| 4,572,811 | 2/1986 | Ota et al. | 264/532 X |
| 4,613,993 | 9/1986 | Steele et al. | 2/411 |
| 4,724,549 | 2/1988 | Herder et al. | 2/411 |
| 4,754,501 | 7/1988 | Yahn | 2/425 X |

FOREIGN PATENT DOCUMENTS 1171202  7/1984  Canada ................................. 2/411

*Primary Examiner*—Wm. Carter Reynolds
*Attorney, Agent, or Firm*—Nicholas L. Coch

[57] ABSTRACT

A lightweight molded protective helmet for use by cyclists and preferably produced by stretch-blow molding a moldable plastic material. The helmet includes outer and inner shells or surfaces each having a plurality of openings therein, with the surfaces being connected together by walls of the openings formed integral with the surfaces of the helmet. The openings in the helmet surfaces can have any shape such as circular or elongated, and can be made substantially perpendicular or inclined to the surfaces. Also if desired, the space between the substantially parallel outer and inner surfaces can be filled with a plastic energy-absorbing foam material to provide a composite helmet construction.

18 Claims, 2 Drawing Sheets

(a)

(b)

(c)

LIGHTWEIGHT MOLDED PROTECTIVE HELMET

BACKGROUND OF THE INVENTION

This invention pertains to unitary lightweight molded protective helmets, and particularly to such helmets having outer and inner apertured surfaces integrally molded together preferably by using a blow molding procedure.

Various designs of protective helmets such as for wear by cyclists have been developed and used in the past. For example, U.S. Pat. No. 3,551,911 to Holden discloses a protective helmet made from a unitary piece of flat flexible material such as vinyl foam, which is die cut and perforated and then formed and retained to the desired helmet shape by additional taped pieces. U.S. Pat. No. 3,934,271 and U.S. Pat. No. 3,992,722 to Rhee disclose a formed protective helmet having openings and formed of a resilient plastic foam material and covered by a tough surface coating fused thereon. U.S. Pat. 3,935,044 to Daly discloses a helmet which utilizes separately spaced inner and outer shells with the intervening cavity filled by a resilient plastic foam material. U.S. Pat. No. 4,279,038 to Bruckner el at discloses a head protector made of one-piece apertured foam material having a closed surface skin. U.S. Pat. No. 4,434,514 to Sundahl et al and U.S. Pat. No. 4,612,675 and U.S. Pat. No. 4,627,115 to Broersma disclose protective helmets made of a plastic outer skin with a liner of soft molded foamed plastic material and having ventilation slots provided therein.

Although these prior art helmets have been found useful, further improvements in protective helmets are needed to provide the wearer with a strong helmet which is lighter in weight and also exhibits improved ventilation and shock absorption characteristics.

A principal object of this invention is to provide an improved lightweight and high strength cyclist helmet. Another object of the invention is to provide a protective helmet of unitary dual shell construction which is readily manufactured by blow molding techniques.

SUMMARY OF THE INVENTION

The present invention provides an improved lightweight unitary molded protective helmet which is formed by molding a moldable plastic material. The helmet structure comprises an outer surface and an adjacent spaced apart conforming inner surface, which each of the surfaces or shells being joined together at their periphery by a wall formed during the molding, so as to form a generally hollow interior space therebetween. The dual surfaces contain a plurality of molded adjacent spaced openings extending from the outer surface through the inner surface, with each opening being defined by a continuous wall connecting the outer surface to the inner surface, thereby forming a plurality of individually spaced interconnected compartment located between each of the adjacent openings. Each of the spaces is formed by a passageway bounded by proximate spaced areas on each of the surfaces and corresponding walls of the openings, so that the spaces are adapted to provide impact absorbing characteristics for the helmet whenever used under impact stress conditions. When the unitary helmet is produced by using for example, a stretch-blow molding procedure, the material is stretched biaxially during molding, with the result that the helmet is not only made lightweight by having relatively thin walls and by the spaced apart openings provided in the surfaces, but the construction also utilizes the material more efficiently to produce a lightweight helmet which provides improved impact and shock absorbing characteristics.

The helmet surface openings are spaced apart from each other so as to provide a connecting web surface having a width equal to about 0.5 to 4.0 times the overall thickness of the helmet. A protective helmet constructed in accordance with this invention has met the American National Standards for Protective Headgear for Bicyclists, No. Z90.4-1984.

In another useful embodiment of the invention, the interior space between the helmet outer and inner surfaces can be advantageously filled by injection with an energy-absorbing plastic foam material, which serves to enhance the shock absorbing and impact resistance characteristics of the dual surfaces without adding appreciable weight to the helmet.

Protective helmets having dual apertured surfaces constructed according to this invention by using blow molding procedures are useful for protection against head injuries to persons while riding a bicycle, motorcycle, or on horseback. The helmet is also useful while participating in various contact sports such as boxing, karate, football, or hockey.

BRIEF DESCRIPTION OF DRAWINGS

The invention will be further described by reference to the following drawings, in which.

DESCRIPTION OF INVENTION

Figure 1:
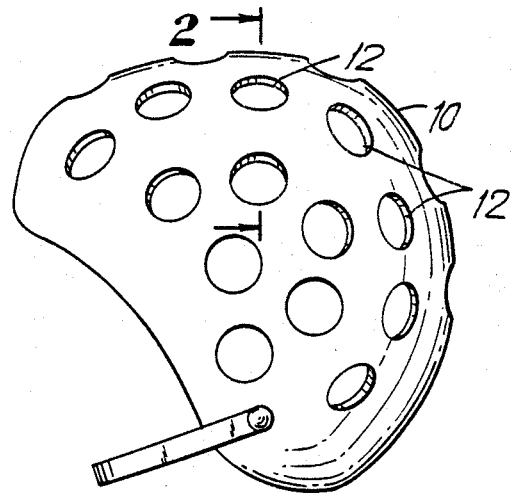
FIG. 1 shows a perspective view of one embodiment of a protective helmet containing a plurality of circular shaped openings.
Figure 2:
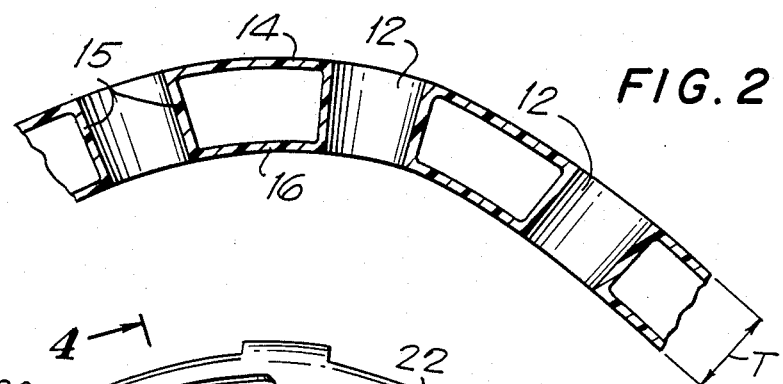
FIG. 2 is a partial cross-sectional view of the helmet taken at line 2—2 of FIG. 1.

Referring now to the drawings, FIG. 1 shows a perspective view of a protective helmet constructed according to one useful embodiment of the invention, and FIG. 2 is a partial cross-sectional view of the FIG. 1 construction. The helmet 10 consists of dual adjacent surfaces or shells 14, 16 which are usually made substantially parallel with each other and integrally formed of a moldable plastic material and produced employing for example, stretch-blow molding technology. As shown in FIG. 2, the dual curved surfaces 14, 16 of the helmet contain a plurality of openings 12 extending through the dual surfaces, so that outer surface 14 is integrally connected to inner surface 16 by walls 15 of the openings 12 so as to form a plurality of interconnected compartment-like spaces or zones 13 therebetween. The dual surfaces 14, 16 are also connected at the periphery of the helmet by a continuous peripheral wall 17. The openings 12 can have any of a variety of shapes, such as circular, triangular, rectangular, or a combination thereof. Also, the openings 12 can be oriented substantially perpendicular to the surfaces 14, 16, or alternatively at least some openings 12a can be inclined at an angle A of 45°–90° with the surfaces 14, 16 to facilitate ventilation of the helmet during use.

The thickness of the inner and outer surfaces or layers 14, 16, the spacing between adjacent openings 12, and the thickness of openings walls 15 are all selected so that the helmet can be molded preferably by using stretch-blow molding procedures employing commerically available plastic materials to produce a protective helmet that is lightweight and exhibits improved impact resistance and shock absorbing characteristics and enhanced ventilation for the wearer. The helmet 10 is retained on the head of a cyclist by a chin strap 18, which is length adjustable and is attached to each side of the helmet by suitable fastener means 19 such as rivets.

As generally shown in FIG. 2, the thickness of surfaces 14, 16, and the walls 15 are all made sufficiently thin to be moldable preferably by stretch-blow molding procedure, and yet are thick enough to provide appreciable structural support for the surfaces so as to provide high energy absorption for any impact forces usually received by the helmet outer surface. The thickness of the surfaces 14, 16 and walls 15 should be at least about 0.050 inch and usually need not exceed about 0.10 inch. The overall thickness T of the helmet dual surfaces should be at least about 0.300 inch, and usually need not exceed about 0.60 inch. The spacing S between adjacent openings 12 in the helmet should be at least about equal to the helmet overall thickness T and should not exceed about 5 times the helmet overall thickness. The spacing S between adjacent openings need not be uniform over the entire surface of a helmet, but the spacing between adjacent openings as well as the shape of the openings can be varied as desired for a particular helmet configuration.

Materials which are useful for producing the molded protective helmet should be plastics which are adaptable for stretch-blow molding and have good shock absorption characteristics, and include polyethylene (PE), high density polyethylene (HDPE), polyethylene terephthalate (PET), polypropylene (PP), polyvinyl chloride (PVC), polyacrylonitrile (PAN), polycarbonates (PC) and acrylonitrile butadiene styrene (ABS).

Figure 3:
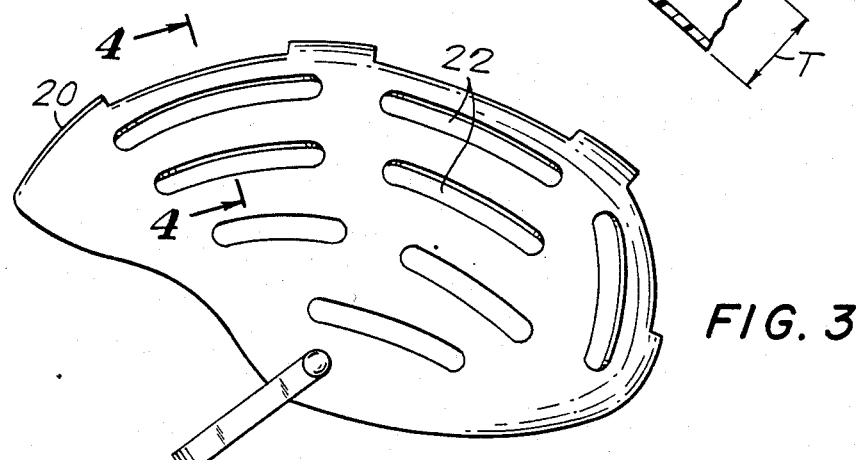
FIG. 3 shows a perspective view of an alternative embodiment of the helmet having elongated shaped openings.
Figure 4:
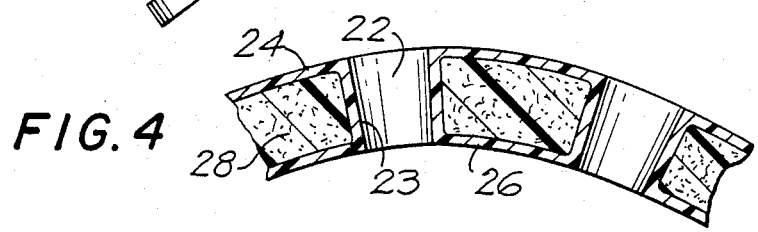
FIG. 4 is a partial cross-sectional view of the helmet of FIG. 3 taken at line 4—4 and including a foam material provided between the dual shells.

An alternative embodiment of the invention is shown by FIG. 3, which illustrates a perspective view of a helmet 20 that is similar to FIG. 1, but has a relatively compact shape and the openings 22 formed by walls 25 therein have generally elongated shapes. Also if desired, the intervening and interconnected spaces or zones 23 between outer surface 24 and inner surface 26 can be advantageously filled with a plastic foam material 28, as shown in cross-section by FIG. 4. Foam material 28 such as polyurethane is perferably injected into the space after the dual surfaces 24 and 26 have been molded. The helmet is retained on the head of a cyclist by a suitable strap means 29. During use of the helmet by a cyclist, whenever the helmet is subjected to any impact of external forces on the helmet outer surface, the kinetic energy is effectively absorbed by the dual surfaces and the interconnecting walls 25 of the openings in combination with the foam fill material 28 and may result in the helmet being deformed slightly by a severe localized impart force.

Figure 5:
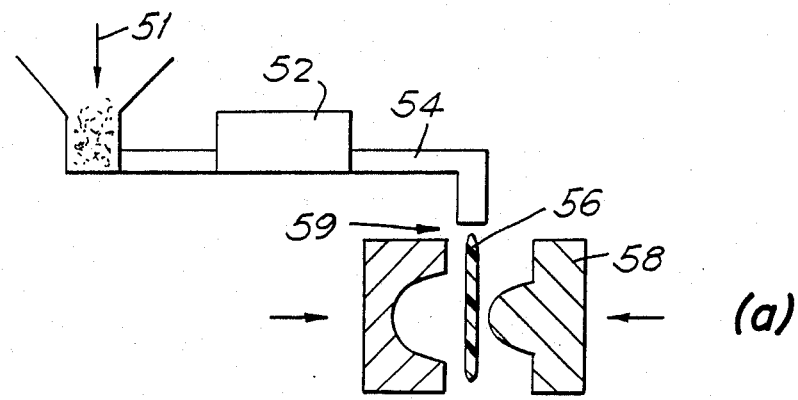
FIG. 5 is a schematic flow diagram showing the stretch-blow molding procedure used for forming the helmet.
Figure 5:
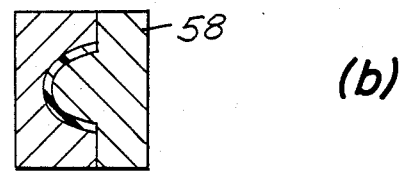
Figure 5:
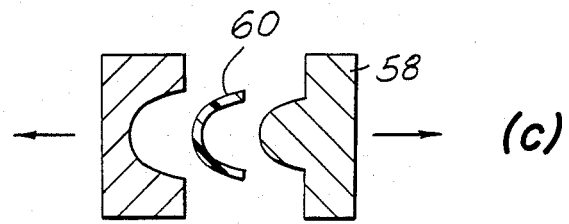

The advantageous and unique characteristics of the protective helmet of this invention are provided by the integrally formed dual surface-type construction and the blow molding method preferably used for producing it. As generally shown by the FIG. 5 schematic diagram, the preferred stretch molding procedure is described for illustrative purposes. Material in a suitable pellet or powder form exits from hopper 51, and then is passed to a heating station 52 where it is melted so as to be amde flowable. The resulting molten material at 54 then passes to a forming station in which a parison 56 of the moldable material is suspended between dual mating parts of a mold 58. The mold consists of interfitting concave and convex shaped mold parts, which are moved together while a pressurized blowing and cooling gas is simultaneously injected at 59 into the interior of the parison 56 to form a molded helmet 60. Suitable inserts are included in the connecting mold to produce the walls and openings of the finished helmet. After an appropriate time interval sufficient for the formed helmet to cool and attain a stable shape, the mold parts are moved apart, the flash material if any is cut away, and the helmet 60 is removed from the mold.

By this blow molding method, the moldable material in the parison 56 is stretched biaxially during the forming step, i.e., it is stretched in both the longitudinal and lateral directions. Such biaxial molding produces stronger surfaces and helmet structure than if the molding material is stretched in only a single direction during molding.

Although this invention has been described broadly and in terms of certain embodiments, it will be understood that modifications and variations can be made as defined within the scope of the following claims.

I claim:

1. In a unitary lightweight protective helmet, formed by blow molding of a moldable plastic material, the combination comprising:
   (a) an outer surface and an adjacent spaced apart conforming inner surface, each of said surfaces being joined at their periphery by a wall formed during molding, so as to form a generally hollow interior space therebetween;
   (b) a plurality of molded adjacent spaced openings extending from said outer surface through said inner surface, each said opening being defined by a continuous wall connecting said outer surface to said inner surface and thereby forming a plurality of individually spaced interconnected zones located between a plurality of said adjacent openings; and
   (c) each of said zones being formed by a passageway bounded by proximate spaced areas on each of said respective surfaces and corresponding walls of said openings, whereby said zones are adapted to provide impact absorbing characteristics for the helmet when placed under load stress conditions.

2. A helmet as defined in claim 1, wherein said outer and inner surfaces each have a thickness of 0.05–0.10 inch and are spaced apart from each other sufficient to provide an overall thickness of 0.30–0.60 inch.

3. A helmet as defined in claim 1, wherein said spaced areas located between adjacent openings have a width dimension which is about 0.5–4.0 times the overall thickness of said outer and inner surfaces.

4. A helmet as defined by claim 1, wherein said openings extending through said outer and inner surfaces are circular shaped.

5. A helmet as defined by claim 1, wherein said openings extending through said outer and inner surfaces are elongated shaped.

6. A helmet as defined by claim 1, wherein the wall of each said openings is oriented substantially perpendicular to said outer and inner surfaces.

7. A helmet as defined by claim 1, wherein the wall of at least one of said openings is inclined at an angle of 45°–90° with the outer surface.

8. A helmet as defined by claim 1, including an energy-absorbing foam material provided in the space within the passageways between said outer and inner surfaces.

9. A helmet as defined in claim 1, wherein said surfaces each have a thickness of 0.05–0.10 inch and the walls each have a thickness of 0.040–0.10 inch so as to provide a helmet having an overall thickness of 0.30–0.60 inch, with the spacing between adjacent said openings being about 1 - 5 times the helmet overall thickness.

10. A helmet as defined by claim 1, wherein the surfaces and walls are molded of polyethylene (PE) material.

11. A helmet as defined by claim 1, wherein the surfaces and walls are molded of high density polyethylene (HDPE) material.

12. A helmet as defined by claim 1, wherein the surfaces and walls are molded of polyethylene terephthalate (PET) material.

13. A helmet as defined by claim 1, wherein the surfaces and walls are molded of polypropylene (PP) material.

14. A helmet as defined by claim 1, wherein the surfaces and walls are molded of polyvinylchloride (PVC) material.

15. A helmet as defined by claim 1, wherein the surfaces and walls are molded of polyacrylonitrile (PAN) material.

16. A helmet as defined by claim 1, wherein the surfaces and walls are molded of polycarbonates (PC) material.

17. A helmet as defined by claim 1, wherein the surfaces and walls are molded of acrylonitrile butadiene styrene (ABS) material.

18. In a unitary lightweight protective helmet formed by stretch-blow molding of a moldable plastic material, the combination comprising:
 (a) an outer surface and an adjacent spaced apart conforming inner surface, each said surface being joined at their periphery by a wall formed during molding, so as to form a generally hollow interior space therebetween, said surfaces each having a thickness of 0.050–0.10 inch and an overall thickness of 0.30–0.60 inch;
 (b) a plurality of molded adjacent spaced openings extending from said outer surface through said inner surface, each said opening being defined by a continuous wall connecting said outer surface to said inner surface and thereby forming a plurality of spaced interconnected zones located between a plurality of said adjacent openings, said openings wall thickness being 0.040–0.090 inch; and
 (c) each of said zones being formed by a passageway bounded by proximate spaced areas on each of said surface layers and corresponding wall of said openings, the surface spacing area width between adjacent said openings being about 0.5–4 times the helmet overall thickness, whereby said zones are adapted to provide impact absorbing characteristics for the helmet when placed under load stress conditions.

* * * * *